July 8, 1969     D. H. EBERLY, JR     3,454,444
METHOD AND APPARATUS FOR ASSEMBLING INTERLOCKING WOODEN PANELS
Filed Oct. 23, 1965     Sheet 7 of 7

INVENTOR
DAVID H. EBERLY, JR.

BY *Cushman, Darby & Cushman*
ATTORNEYS

United States Patent Office 3,454,444
Patented July 8, 1969

3,454,444
METHOD AND APPARATUS FOR ASSEMBLING INTERLOCKING WOODEN PANELS
David H. Eberly, Jr., York, Pa., assignor to Lok-Box, Inc., York, Pa., a corporation of Pennsylvania
Filed Oct. 23, 1965, Ser. No. 503,870
Int. Cl. B27d 1/00
U.S. Cl. 156—304                            14 Claims

ABSTRACT OF THE DISCLOSURE

A method of assembling four wooden panels each having opposite marginal edge portions formed with a plurality of spaced fingers of a configuration complementary to the notches into a box by effecting an initial interlocking of the panels by a relative rectilinear movement of the panels in one direction only from a separated pre-assembly position and a final interlocking of the panels by effecting a continuation of the initial relative movement combined with a relative rectilinear movement of the panels together in a normal direction and an apparatus for carrying out the method including four magazine units for supplying successive inner panels of four row formations into a feeding position at which the inner panels are applied with adhesive by nozzles, four vertically movable panel stripping members for moving the four panels from the feeding position into a pre-assembly position, and four pairs of panel engaging members for supporting the four panels in the pre-assembly position by a suction action and for effecting the aforesaid initial interengagement and final interlocking. The machine also includes an automatic control circuit for effecting the sequential operation of the adhesive applying nozzles, the panel stripping members and the panel engaging members to continuously assemble successive boxes.

---

This invention relates to packaging and more particularly to an improved method and apparatus for gluing and assembling wooden box panels.

Wooden boxes assembled from panels having opposite marginal edge portions formed with a plurality of spaced notches defining a plurality of spaced fingers of a configuration complementary to the notches are old and well-known in the art. While such boxes are not as in wide use as they once were, there is still considerable production for use in specialized packaging for many specialty items such as men's cologne, men's shaving lotion, and the like. Moreover, there is a limited use of such boxes in the cigar industry. Boxes of this type having neither a top nor bottom are still used extensively in the honeybee industry.

The present commercial practices utilized to produce wooden boxes of the type described have not significantly changed over an extended period of years. Most machines presently in use are quite old and involve hand feeding of the panels by an operator, requiring operator time and attention during the assembly of each unit. To a considerable extent, production from such machines is dependent upon operator skill. After a period of experience in working with such a machine, an operator can become quite proficient in effecting assembly of the panels without an excessive number of rejects. It appears that an experienced operator can get the "feel" of the mechanism of the machine and by skilled manual manipulation is ultimately capable of achieving results regarded as acceptable.

As a practical matter, an increase in the use of wooden boxes in the packaging industry could be achieved by reducing the costs of production and such cost reductions can best be made by reducing the amount of skilled labor required in the manufacturing process.

An object of the present invention is the provision of a novel method for gluing and assembling wooden panels into a box configuration which is capable of such reduction in the costs heretofore required.

Efforts to mechanize the feeding of panels to the old machines of the prior art have not proven entirely successful because of the large number of rejects which occur when the skill of the operator is eliminated. It appears that the basic mechanism embodied in these machines for effecting the assembly of the panels is not sufficiently fool-proof for totally automatic high-speed operation. This insufficiency appears to lie in the mechanical movements imparted to the panels in effecting the intial interengagement and final interlocking. The machines of the prior art have accomplished this initial interengagment and final interlocking in one step, by a combined relative movement of the panels together in two directions. The present invention involves a fundamental method of effecting the initial interengagement and final interlocking in two steps, in the first of which initial interengagement is accomplished by a relative rectilinear movement of the panels inwardly in one direction only; and, in the second of which final interlocking of the panels is accomplished by a continuation of the initial relative movement combined with a relative rectilinear movement of the panels together in a normal direction. The utilization of the novel two-step assembly process of the present invention not only makes practical operation with unskilled operators a reality, but also makes total automation of the feeding of the panels and their assembly at high speed and with lower rejects a commercial reality.

Accordingly, it is a further object of the present invention to provide apparatus for assembling wooden panels of the type described which provides for movement of the panels into initial interengagement and final interlocking in the manner described above.

Another object of the present invention is the provision of apparatus for assembling wooden panels of the type described which is capable of high-speed automatic effective operation with a minimum of rejects so as to materially reduce the cost of manufacturing.

Still another object of the present invention is the provision of the apparatus of the type described having improved means for feeding a set of four panels from a supply and improved means for receiving the said panels and moving the same into interlocking engagement.

Still another object of the present invention is the provision of an apparatus of the type described which is simple but effective in operation and economical to maintain.

These and other objects of the present invention will become more apparent during the course of the following detailed description and appended claims.

The invention may best be understood with reference to the accompanying drawings wherein an illustrative embodiment is shown.

Referring now more particularly to FIGURES 1 through 4, there is shown therein an apparatus, generally indicated at 10, embodying the principles of the present invention. The apparatus 10 is operable to glue and assemble successive sets of four wooden panels, generally indicated at P, into open top and open bottom rectangular box structures. The panels P themselves are of conventional construction and form no part of the present invention. Each panel P has opposite marginal edge portions formed with a plurality of spaced notches which define a plurality of spaced fingers of a configuration complementary to the notches, all in accordance with conventional practice.

In assembling the panels P into the box structure by the apparatus, a set of four panels are utilized and when assembled, the four panels form a rectangle with the fingers and notches at the adjacent marginal edge portions of each pair of adjacent panels interlocked in engagement. Each pair of interengaging edge portions will have the fingers of one panel positioned to engage within the notches of the other panel and vice versa, all in accordance with conventional wooden box structures of this type. The term "box" as herein employed refers to the glued and assembled set of four panels. This box may be utilized without a top or bottom as, for example, in supporting honeycombs or the like, may be subsequently provided with a bottom for use as a tray or the like, or may be subsequently provided with both a top and bottom. Stated differently, the term "box" as used herein may refer either to an open bottom and open top structure, an open top structure, or a structure provided with both a top and a bottom panel so long as that structure includes a set of four panels assembled with their marginal edge portions interlocked as aforesaid.

The apparatus 10 comprises a frame assembly, generally indicated at 12, upon which are mounted a set of four panel supplying mechanisms or magazine units, generally indicated at 14. The panel supplying mechanisms are adapted to receive a set of four rows of panels and to bias the rows so as to present a set of four inner panels to be moved outwardly of the rows. Associated with each of the panel supplying mechanisms 14 is a glue applying mechansim, generally indicated at 16, for applying glue within the notches in a marginal edge portion of each panel in the rows so that at least one of each pair of cooperating marginal edge portions of the four inner most panels will have glue applied thereto prior to movement out of the row.

In order to effect movement of the four inner panels from the respective rows carried by the panel supplying mechanisms 14, there is mounted on the frame means 12 a feeding mechanism, generally indicated at 18, which is operable to move successive inner panels from their respective rows and into a pre-assembly position. Preferably, this movement is a vertical rectilinear movement.

The present apparatus also includes a panel receiving and interlocking mechanism, generally indicated at 20, for receiving the successive set of four panels moved into the pre-assembly position by the feeding mechanism 18 and effecting a relative movement between the panels to initially interengage the cooperating marginal edge portions of the panels and finally interlocking the same. In accordance with the principles of the present invention, the panel receiving and interlocking mechanism 20 is operable to effect initial interengagement by a relative rectilinear movement of the panels together in one direction only. The final interlocking is accomplished by continuing the initial relative rectilinear movement of the panels together in the one direction while simultaneously effecting a relative rectilinear movement of the panels together in a normal direction. The apparatus 10 is preferably of the automatic type arranged to effect the operation of the various mechanisms described above in a continuous sequential fashion.

FRAME ASSEMBLY

Figure 1:
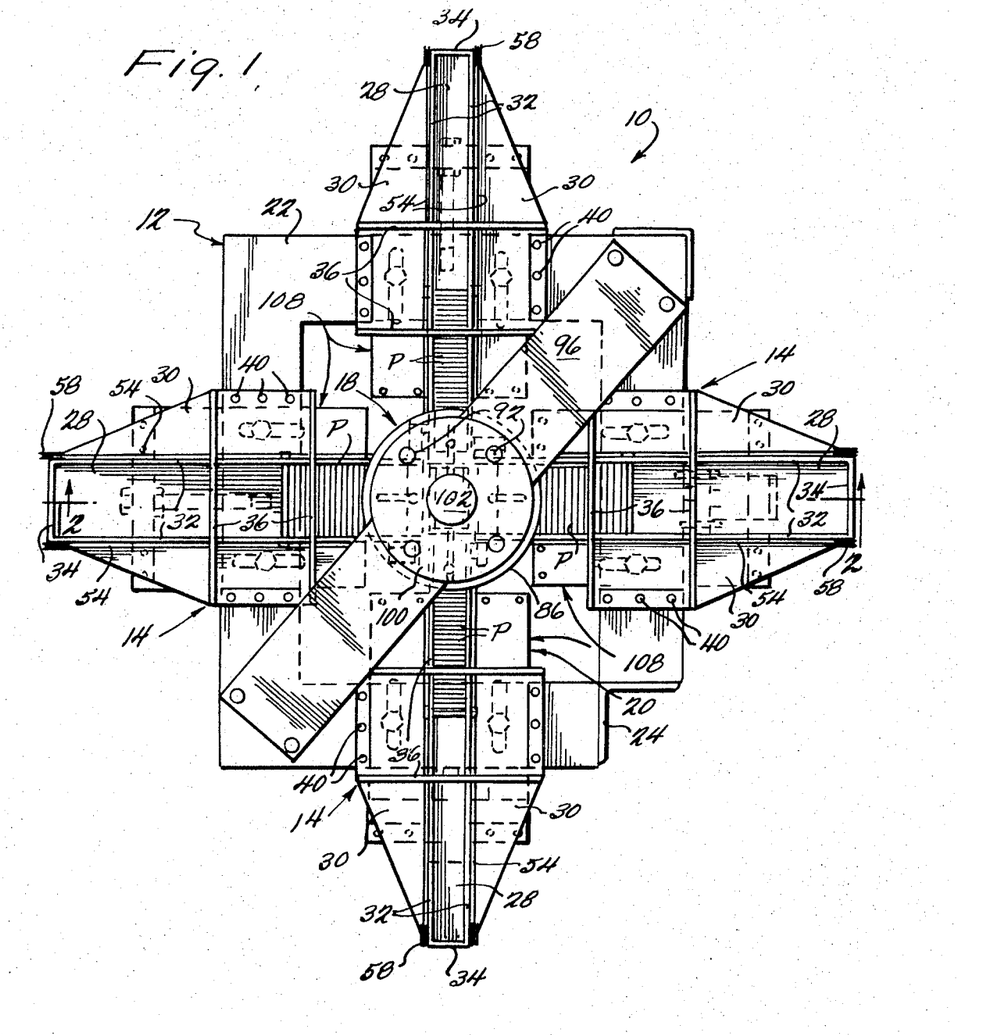
FIGURE 1 is a top plan view of an apparatus for gluing and assembling wooden panels of the type described which embodies the principles of the present invention.
Figure 2:
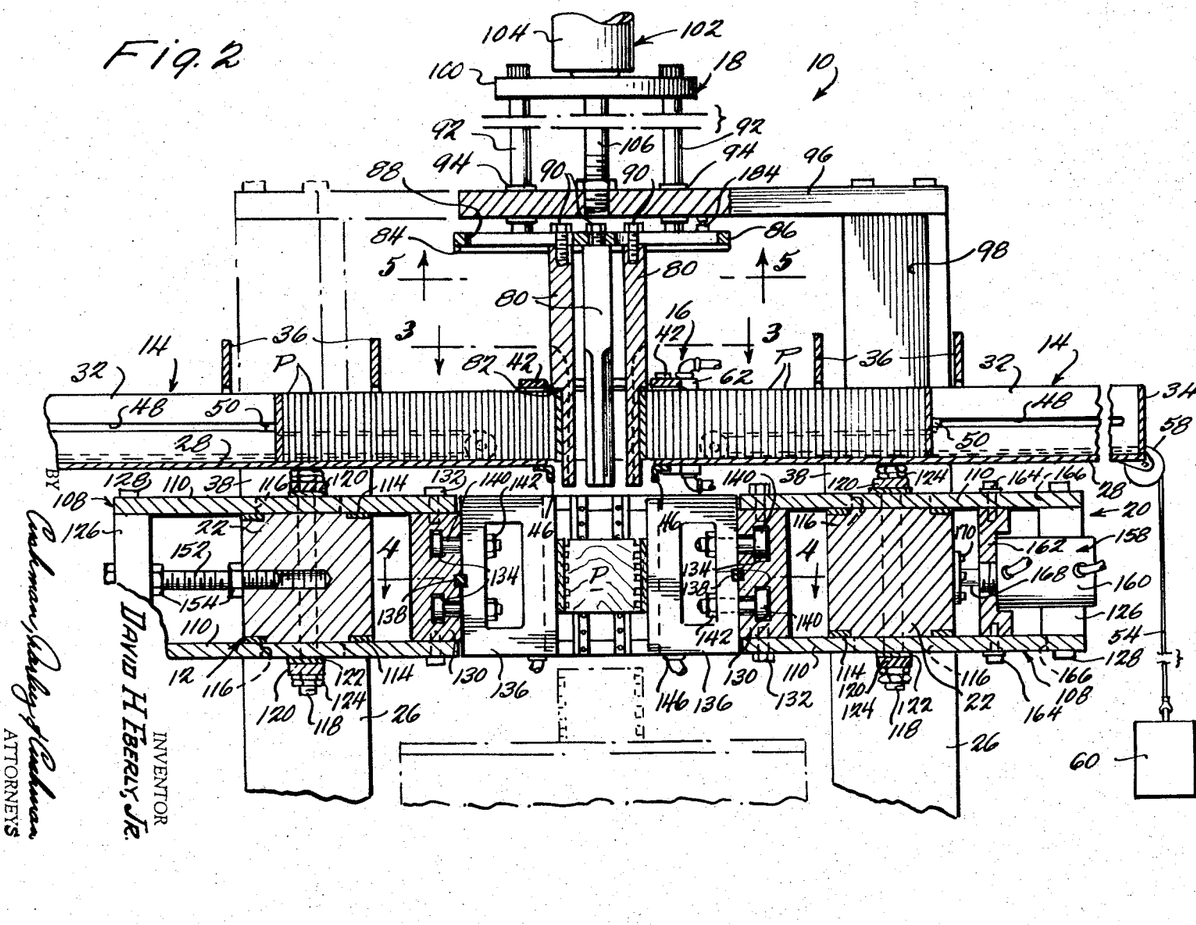
FIGURE 2 is an enlarged, fragmentary sectional view taken along the line 2—2 of FIGURE 1.

It will be understood that frame assembly 12 of the present invention may be of any desired construction providing sufficient strength and rigidity to accomplish the various movements with reasonable accuracy. As shown, the frame assembly 12 includes a main frame member or casting 22 which is of generally hollow rectangular configuration in plan, as shown in FIGURE 1, and of solid rectangular configuration in section, as shown in FIGURE 2.

The main frame member 22 is of one-piece construction, but preferably is not continuously annular in plan, that is, one corner of the rectangle is separated and the adjacent surfaces are rigidly interconnected as by an angle iron 24. The angle iron 24, together with three similar angle irons 26 fixed to the other three corners of the main frame member 22, provide a rigid leg structure for supporting the main frame member 22 in vertically spaced relation to the floor or other support.

PANEL SUPPLYING MECHANISM

Figure 3:
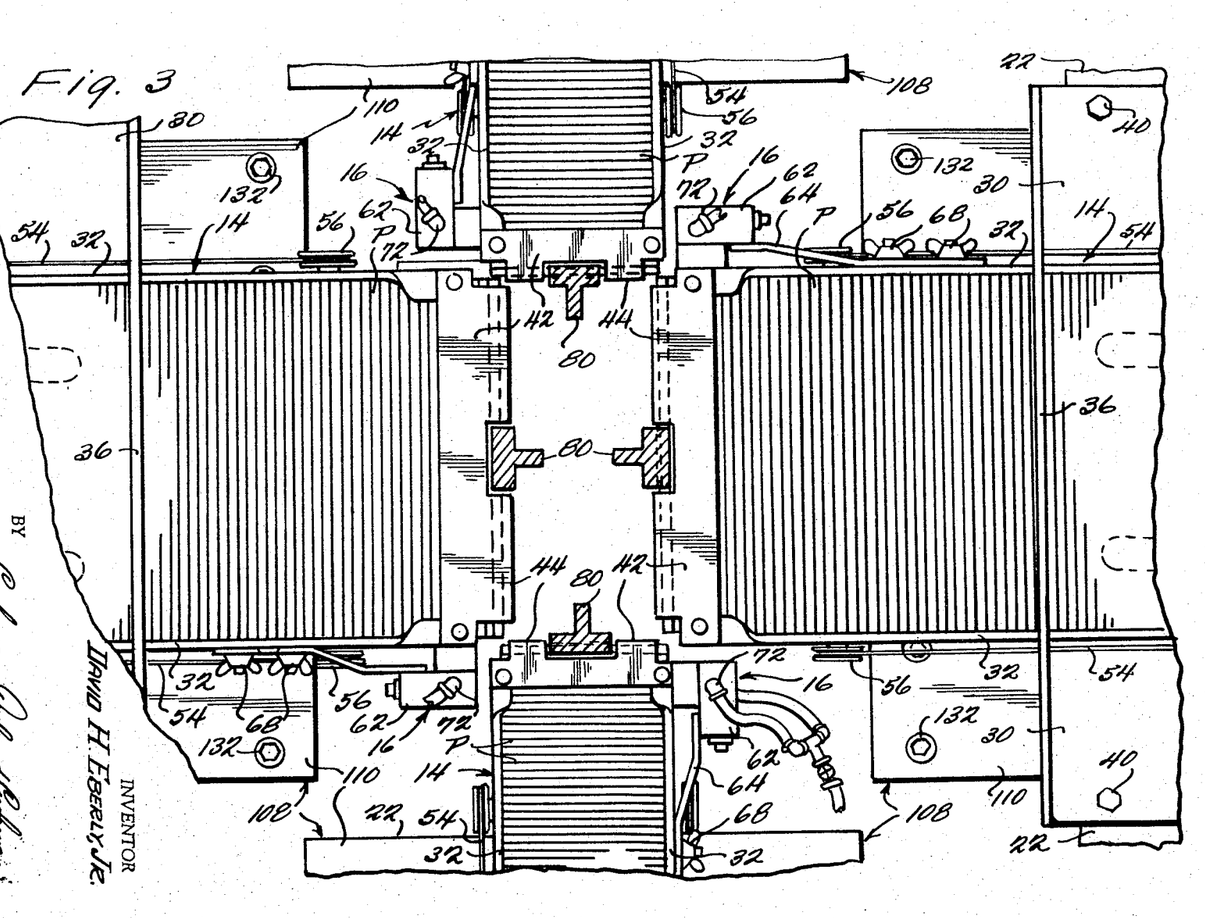
FIGURE 3 is an enlarged, fragmentary sectional view taken along the line 3—3 of FIGURE 2.

As stated above, the present apparatus includes four panel supplying mechanisms 14 and since the construction of all four are substantially the same, a description of one will suffice to give a clear understanding of the structure and operation of all. It will be understood, however, that the construction may vary in size to accommodate panels of different dimensions. For example, as best shown in FIGURE 3, two of the opposed panel supplying mechanisms are of a size to receive side panels while the other two mechanisms 14 are of a size to receive end panels. In the particular embodiment shown, the end panels have a dimension substantially less than the side panels, although it will be understood that all four of the panels may be of the same dimension, so that the term "rectangle" as used herein contemplates within its meaning a rectangle having ends and sides of the same dimension or square.

Referring now more particularly to FIGURES 1–3, each panel supplying mechanism 14 is in the form of a magazine unit and is adapted to receive a row of panels which includes an inner panel, an outer panel, and a plurality of panels therebetween having each flat surface thereof disposed in co-extensive abutting relation to a flat surface of an adjacent panel. To this end, the magazine unit includes a flat bottom plate or wall 28 of elongated rectangular configuration having a pair of oppositely extending wing portions 30 on the central and rearward portions thereof.

Rigidly secured to the bottom plate 28 and extending upwardly therefrom is a pair of side plates 32 which are spaced apart in parallel relation a distance slightly greater than the coresponding dimension of the panels received in the associated magazine unit. The side plates 32 are reinforced at their rearward ends by a rearward end wall 34 and at their central portions by a pair of generally inverted U-shaped brace members 36, the legs of which are rigidly secured, as by welding or the like, to the outer surface of the associated side plates 32 and to the adjacent upper surface of the associated wing portions 30 of the bottom plate 28. Each magazine is fixedly secured to the associated side of the main frame member 22, as by a pair of mounting blocks 38 fixedly mounted, as by bolts 40 or the like, between the upper surface of the associated side of the main frame member 22 and the outer ends of the associated wing portions 30.

Figure 7:
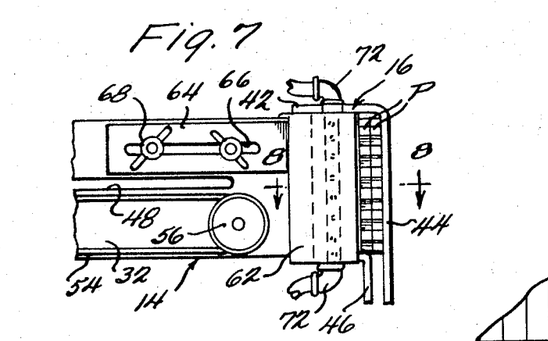
FIGURE 7 is a fragmentary side elevational view of the feeding end of a panel magazine showing the associated glue applying assembly connected therewith.

The inner end of the magazine is constructed to retain the inner panel in a position to be moved rectilinearly downwardly by the panel feeding mechanism 18. To this end a plate member 42 is fixedly secured, as by welding or the like, to the upper inner end surfaces of the side plates 32. The plate 42 includes a pair of vertically downwardly extending horizontally spaced inner panel engaging fingers 44 which preferably are of spring steel construction. The lower ends of the fingers extend below the bottom plate 28, as shown in FIGURE 7, and an L-shaped member 46 is secured at one of its legs to the lower inner end surface of the bottom plate and has its other leg extending downwardly therefrom in spaced parallel relation to the fingers 44.

Any suitable means may be provided for biasing the row of panels inwardly so that as the inner panel of the row is removed therefrom between the fingers 44 and member 46, the next adjacent panel of the row will be moved into a position of engagement with the fingers 44. As shown, the side plates 32 are provided with coextensive elongated extending slots 48 within which a pair of lugs 50 formed on opposite ends of an outer panel engaging follower plate 52 are slidably engaged. Each of the lugs 50 is connected with one end of a flexible element, such as a wire 54 or the like, which extends inwardly from the associated lug and around an inner pulley 56 suitably journaled at the inner portion of the associated side plate 32. From the associated pulley or roller 56, each flexible element extends outwardly and over an outer pulley or roller 58 suitably mounted on the outer end of the associated side plate. Each flexible element 54 extends downwardly from the roller 58 and has a weight 60 carried by the other end thereof (see FIGURE 2). In this way, the weights 60 through the flexible elements 54 serve to bias the follower plates 52 in an inward direction. While spring biasing means may be utilized, the weight biasing arrangement is preferred since it serves to provide a constant biasing force.

GLUE APPLYING MECHANISMS

Figure 8:
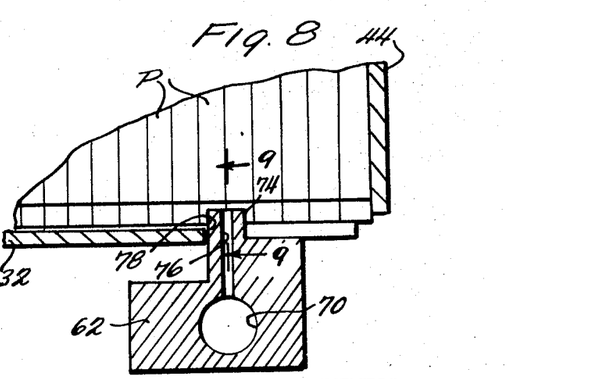
FIGURE 8 is an enlarged, fragmentary sectional view taken along the line 8—8 of FIGURE 7.
Figure 9:
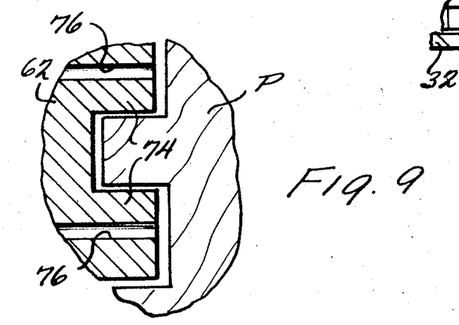
FIGURE 9 is an enlarged, fragmentary sectional view taken along the line 9—9 of FIGURE 8.

Referring now more particularly to FIGURE 3, it will be noted that there are four glue applying mechanisms 16 provided, each being associated with the inner end portion of one of a corresponding side plate 32 of each panel supplying mechanism 14. As best shown in FIGURES 7 through 9, each glue applying mechanism includes a nozzle body 62 which is rigidly secured to the associated side plate 32, as by a bracket 64. Each bracket 64 is fixedly secured at one end to the associated nozzle body 62, as by welding or the like, and is provided with a central elongated horizontally extending slot 66. A pair of bolt assemblies 68 extend through suitable apertures formed in the associated side plate 32 and the elongated slot 66 so as to fixedly secure the nozzle body 62 for adjustment toward and away from the fingers 44 of the associated magazine.

As best shown in FIGURE 8, the nozzle body 62 is formed with a main vertical manifold bore 70 having tube fittings 72, connected at opposite ends thereof through which a supply of glue or adhesive is fed. The side of the nozzle body 62 adjacent the side plate 32 includes a plurality of outwardly projecting nozzle portions 74 of a size to engage within the notches formed in the associated panels. An orifice 76 is formed in each nozzle portion 74 and in communicating relation to the main manifold bore 70 so that glue contained therein will flow outwardly through the orifices 76 and be deposited within each notch of the panels carried by the associated magazine. As best shown in FIGURE 8, the adjacent portion of the side plate 32 is cut out, as indicated at 78, to permit the nozzle portions 74 to be positioned within the notches of the panels.

PANEL FEEDING MECHANISM

Figure 5:
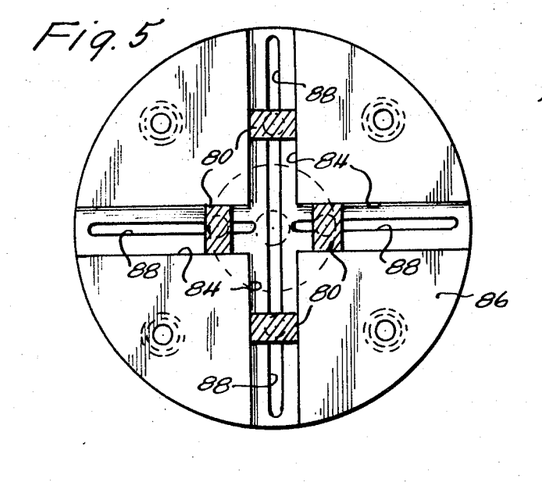
FIGURE 5 is an enlarged, sectional view taken along the line 5—5 of FIGURE 2.

Referring now more particularly to FIGURES 1–3, the panel feeding mechanism 18 includes four inner panel engaging stripper bars 80. As best shown in FIGURE 3, the stripper bars are of a width to engage between the spaced fingers 44 and the lower end portion of each is formed with an outwardly and downwardly facing notch 82 for receiving an engaging an associated panel. The upper end portion of each bar 80 is mounted within a radially extending groove 84 formed in a circular mounting plate 86 (see also FIGURE 5). The mounting plate 86 includes a radially extending elongated slot 88 associated with each groove 84 through which a bolt 90 extends to secure the associated stripper bar 80 a proper position of adjustment within the associated groove 84.

The mounting plate 86 is carried by the frame assembly 12 for vertical reciprocating movement by any suitable means, such as a plurality of circumferentially spaced vertically extending guide rods 92 secured at their lower ends to the mounting plate 86 and extending upwardly therefrom through bearings 94 mounted in a cross frame member 96. The cross frame member 96 is fixed to the main frame member 22 in vertically spaced relation thereto, as by a pair of vertical frame members 98 fixed at their upper ends to the ends of the frame member 96 and at their lower ends to the upper surface of the frame member 22 at opposite corners thereof.

The upper ends of the guide rods 92 are fixedly secured to a circular plate 100 and a fluid pressure operated ram unit 102 and is connected between plate 100 and the central portion of the frame member 96 to effect the vertical reciprocating movement of the stripper bars 80. The unit 102 is preferably of conventional construction operated by air under pressure and includes the usual cylinder 104 fixed to the central portion of the plate 100. The plate is centrally apertured to receive the usual piston rod 106 of the unit 102, the lower end of the piston rod being secured to the central portion of the frame member 96.

PANEL RECEIVING AND INTERLOCKING MECHANISM

Figure 4:
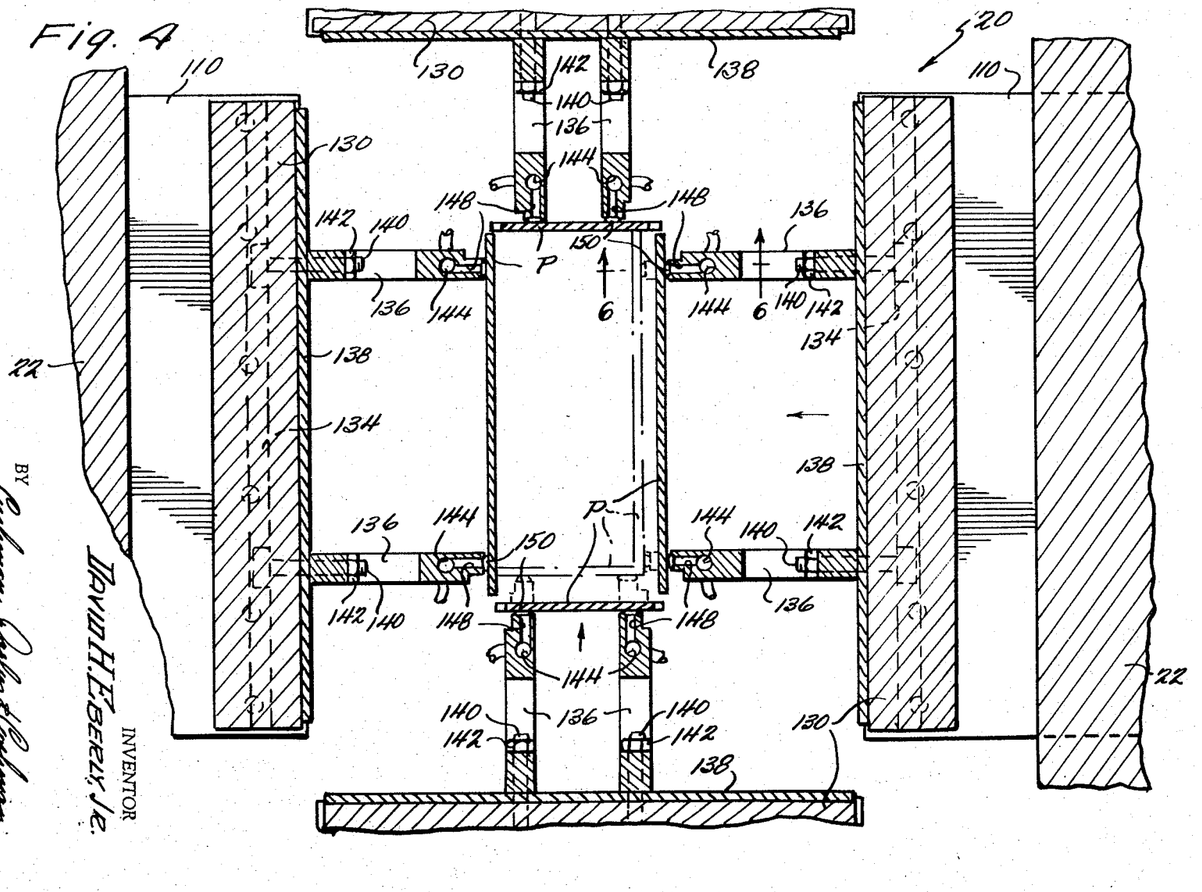
FIGURE 4 is an enlarged, fragmentary sectional view taken along the line 4—4 of FIGURE 2.

As best shown in FIGURES 2 and 4, the panel receiving and interlocking mechanism 20 comprises four plunger units 108. Preferably, for the purpose of convenient interchangeability, all of the units 108 are of substantially the same construction. The plunger units, like the magazine units, are mounted in opposed pairs with each pair being disposed normal to the other pair. Preferably, one unit of each pair is stationary, while the other unit of each pair is mounted for horizontal reciprocating movement.

Each plunger unit 108 includes a pair of upper and lower rectangular plates 110 disposed in sliding engagement with the upper and lower surfaces respectively of an associated side of the main frame member 22.

As shown in FIGURE 2 the upper and lower surfaces of the frame member 22 are provided with bearing inserts 114. Each of the plates 110 has a pair of parallel elongated longitudinally extending slots 116 formed therein through which a pair of bolts 118 extend. Each bolt also extends through a suitable aperture formed in the associated side of the frame member 22 and through a suitable aperture formed in a pair of upper and lower bars 120. Each of the bars 120 is formed with a bearing surface 122 disposed in engagement with the adjacent surface of the associated plate 110. The bars are secured to opposite exterior surfaces of the plates by nuts 124 threadedly engaged at each end of the bolts.

It will be understood that in the case of the stationarily mounted plunger units 108, the nuts will serve to aid in fixedly securing the plates 110 to the frame member 22 in a desired position of adjustment in a direction toward and away from the center of the frame, whereas in the movable plunger units, the nuts 124 will be positioned to permit movement of the associated plates 110 in a direction toward and away from the center of the frame.

Secured between the outer ends of each pair of plates 110 is a pair of horizontally spaced spacer blocks 126, the spacer blocks being detachably fixedly secured to the plates by any suitable means, such as bolts 128. The inner end portion of each pair of plates 110 has a head block 130 detachably fixedly secured therebetween, as by bolts 132. Each of the head blocks 130 is provided with a pair of vertically spaced horizontally extending T-slots 134 which open toward the center of the frame. The inwardly facing surface of each head block is adapted to adjustably receive a pair of panel receiving and retaining members 136. To this end, the central inwardly facing surface of each head block 130 and the central portion of the abutting surface of the associated members 136 are horizontally grooved so as to receive a key member 138 which insures that the members 136 will be retained in engagement with the associated head block 130 in vertical registry. A pair of headed bolts 140 are mounted within the T-slots 134 and extend through suitable apertures formed in each of the members 136. Nuts 142 are threadedly engaged on the ends of the bolts 140 opposite from the heads thereof to fixedly secure each of the panel receiving and retaining members 136 in a proper adjusted horizontally spaced relation with respect to each other, as shown in FIGURE 4.

Figure 6:
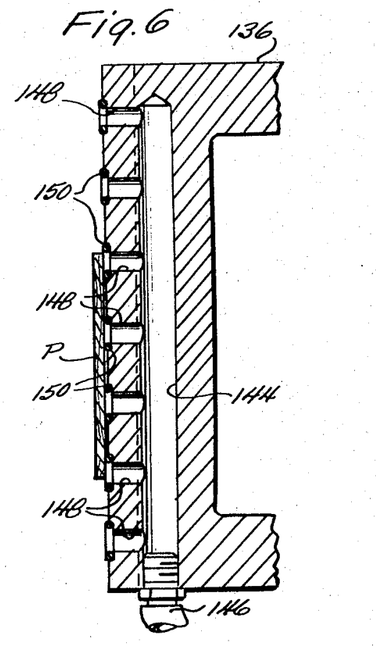
FIGURE 6 is an enlarged, framentary sectional view taken along the line 6—6 of FIGURE 4.

As best shown in FIGURES 4 and 6, each of the panel receiving and retaining members 136 is of generally hollow rectangular configuration in elevation. The portion of each member 136 facing toward the center of the frame has a manifold bore 144 formed therein which extends vertically upwardly from the lower surface thereof. As shown in FIGURE 6, a fitting 146 is secured to the lower end of each bore 144 through which a vacuum source may be communicated with the manifold bore 144. Each manifold bore 144 communicates with a series of vertically spaced horizontally extending openings or apertures 148 each of which extends to the vertical surface of the associated member 136 facing toward the center of the frame. The aforesaid end of each opening 148 has a counterbore formed therein within which is mounted an O-ring seal 150.

As best shown in FIGURE 2, the fixed plunger units 108, in addition to the securement provided by bolts 118, are also fixedly secured in proper adjusted position by a pair of bolts 152, one end of which is threadedly engaged within a suitable aperture formed in the adjacent side of the main frame member 22, the opposite end of which extends through a suitable opening formed in the adjacent spacer block 126. The bolts 152 are fastened in proper adjusted position, as by nuts 154.

The two movable plunger units 108 are provided with fluid pressure operated ram units 156 and 158 for the purpose of effecting the horizontal reciprocating movement thereof. Each of the ram units 156 and 158 includes the usual cylinder 160, one end of which is fixedly engaged within the central portion of a mounting plate 162. Each mounting plate 162 is adjustably fixedly secured between the associated plates 110, as by bolts 164 extending through registering elongated horizontally extending slots 166 formed in the plates. Each of the ram units 156 and 158 also includes the usual piston rod 168 which extends through the associated mounting plate 162 and has its extremity fixedly secured to the adjacent portion of the frame member 22, as by bolts 170 or the like.

AUTOMATIC CONTROL CIRCUIT

Figure 10:
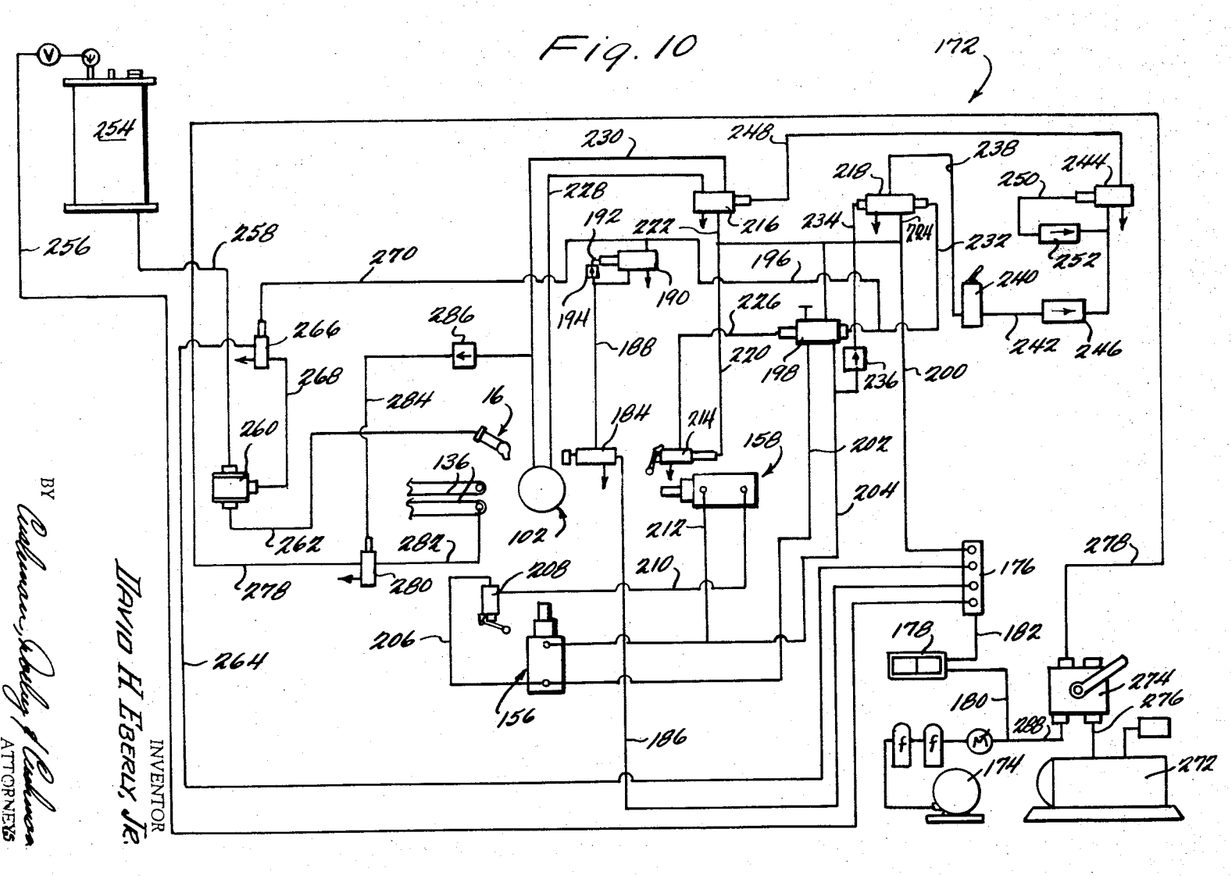
FIGURE 10 is a schematic lay-out view of the power operated circuit of the apparatus.

Referring now more particularly to FIGURE 10 there is shown therein a pneumatic circuit, generally indicated at 172. The circuit includes a compressor 174 of conventional construction the pressure side of which is connected with a pressure manifold 176 in series with a safety relief valve 178, as by lines 180 and 182. The pressure manifold 176 is connected to a feeding mechanism trip valve 184, as by line 186. The valve 184 is normally closed so as to prevent passage of pressure in the line 186 therethrough. The trip valve 184 is carried by the mounting plate 86 of the feeding mechanism 18 in a position to be moved into open position when stripper bars 80 are disposed in their upper limiting positions (see FIGURE 2). When the valve 184 is open, line 186 is communicated with a line 188 leading to a timing valve 190.

The timing valve 190 is normally spring pressed to permit air under pressure in the line 188 to pass therethrough and is closed in response to pilot pressure communicated therewith, as by a line 192, connected in parallel with the line 188 and in series with an adjustable choke 194. When the timing valve 190 is open, air under pressure in the line 188 is communicated with a line 196 connected with a double pilot pressure operated control valve 198 to provide pilot pressure for actuating the same in one direction.

The control valve 198 is a conventional four-way valve and serves to transmit pressure from the manifold 176 through a line 200 to one of a pair of lines 202 and 204 connected with the ram unit 156 on opposite sides of the piston thereof so as to effect an advance and return of the piston rod thereof, respectively. The line 202 has a parallel line 206 communicating therewith which leads to a trip valve 208. The trip valve 208 is of the normally closed type carried by the main frame member 22 of the apparatus in a position to be engaged by the plunger unit 108 associated with the ram unit 156 when the unit has been moved inwardly a predetermined distance. When the valve 208 is thus opened, pressure in the line 206 is communicated to the ram unit 158, as by a line 210, to extend the latter. The ram unit 158 is returned by air under pressure passing through a line 212 connected in parallel with the line 204.

Main pressure line 200 is also connected in parallel with a trip valve 214, a control valve 216 for the feeding mechanism ram unit 102 and a control valve 218, as by lines 220, 222, and 224, respectively. The trip valve 214 is similar to the valve 208 and is mounted on the frame means so as to be engaged and opened when the plunger unit associated with the ram unit 156 or 158 is fully extended. When the valve 214 is open, pressure in the line 220 is communicated to a line 226 which serves to provide pilot pressure for the dual pilot pressure actuated control valve 198.

The valve 216 is a four-way valve which is normally spring pressed into a position to communicate pressure in the line 222 to a line 228 communicating with one end of the feeding mechanism ram unit 102 to effect an upward movement of the stripper bars 80. A line 230 is connected between the opposite end of the ram unit 102 and the valve 216 which is exhausted to atmosphere through the valve 216 in the normal spring pressed position thereof.

The valve 218 is provided for the purpose of controlling pilot air under pressure to the valve 216 to reverse the normal position of the latter. The valve 218 is a double pilot pressure operated valve which receives pressure from a pilot pressure line 232 connected in parallel with the line 196. A line 234 provides a second pilot pressure for the valve 218 and it is connected with the line 204 in series with an adjustable choke 236. Pressure from the pilot line 234 moves the valve 218 into a position to communicate pressure line 224 with a line 238 which is exhausted to the atmosphere when the valve 218 is in its opposite position. The line 238 is connected with a manually actuated start-stop valve 240 for controlling flow of air under pressure from the line 238 to a line 242. The line 242 is connected with a timing valve 244 in series with a choke 246. The valve 244 is similar to the valve 190 and is normally disposed in a position to communicate the line 242 with a pilot line 248 for the valve 216. The valve 244 is closed by air under pressure from a pilot line 250 having an adjustable choke 252 connected therein and in parallel with the line 242 downstream from the choke 246.

As shown in FIGURE 10, there is provided a source of adhesive material or glue for the purpose of supplying adhesive to the glue applying mechanisms 16. As shown, the source is in the form of glue containing pressure vessel 254 maintained under pressure by air through a pressure line 256, communicating between the pressure vessel 254 and the pressure manifold 176. Glue from the pressure vessel 254 is supplied to the mechanism 16 by a main supply line 258 communicating with the vessel and with a control valve 260. It will be understood that when the valve 260 is open, the main glue supply line 258 is connected in parallel with each of the glue mechanisms 16, as by lines 262.

Valve 260 is of a type which is normally opened and closed in response to pilot pressure. Pilot pressure is communicated to the valve 260 by a main pilot pressure line 264 connected at one end with the pressure manifold 176 and leading to a controlled valve 266. The valve 266 is normally open to communicate pressure from the main pilot line 264 to the valve 260 through a line 268 and is closed by pilot pressure from a line 270 connected in parallel with the line 196.

The circuit 172 also includes a vacuum pump 272 which provides a source of vacuum for the plunger units 108. The vacuum side of the pump 272 is connected with a four-way blowout valve 274, as by a line 276. When the valve 274 is disposed in its normal operating position, the vacuum line 276 is communicated with a main vacuum line 278 leading to a control valve 280. Valve 280 is normally disposed in a position to shut off the vacuum in the line 278 from lines 282 connected with the plunger units 108 in parallel. The valve 280 is opened to communicate the vacuum in line 278 with lines 282 by pilot pressure from a line 284 having an adjustable one way choke 286 therein connected in parallel with the line 230. The blowout valve 274 is operable in its other position to communicate the main vacuum line 278 with a pressure line 288 connected in parallel with the line 180.

METHOD AND OPERATION OF THE APPARATUS

Figure 11:
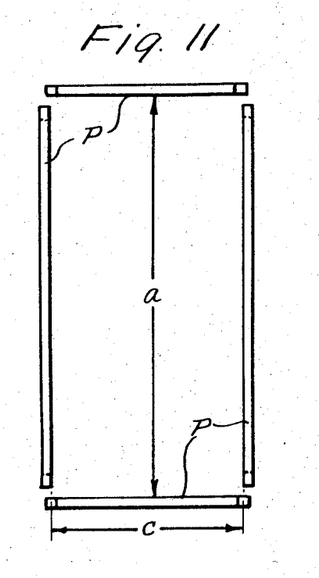
FIGURE 11 is a diagrammatic top plan view showing the relative positions of a set of four panels during feeding and at pre-assembly.
Figure 12:
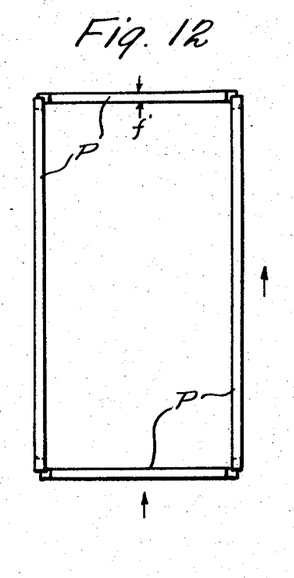
FIGURE 12 is a view similar to FIGURE 11 showing the positions of the panels after initial interengagement.
Figure 13:
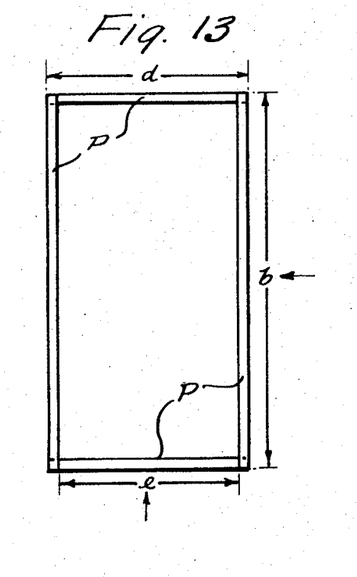
FIGURE 13 is a view similar to FIGURE 11 showing the positions of the panels at final interlocking.

Referring now more particularly to FIGURES 11 through 13, there is shown therein the essential positions assumed by the panels during the assembly in accordance with the method of the present invention. FIGURE 11 shows the four interengageable panels in their preassembly position. In this position, the four panels are arranged with a first pair disposed in co-extensive parallel relation and the other pair of panels disposed in co-extensive parallel relation with each other and in co-extensive normal relation to the first pair of panels. It is important that the opposed flat surfaces of the first pair of panels are spaced apart a distance, $a$, which is greater than the exterior dimension, $b$, of the assembled panels measured in the direction of extent of the second pair of panels. The opposed flat surfaces of the second pair of panels are spaced apart a distance, $c$, which is less than the exterior dimension, $d$, but greater than the interior dimension, $e$, of the assembled panels measured in the direction of extent of the first pair of panels.

With the four panels disposed in the preassembled position described above, the first step in the assembly method of the present invention is to effect a relative movement between the first and second pairs of panels toward one another rectilinearly in the direction of extent of the second pair of panels a distance sufficient to partially interengage the fingers and notches at the adjacent marginal edge portions of all of the panels. This position of initial or partial interengagement is shown in FIGURE 12. In order to insure partial interengagement, as shown in FIGURE 12, the distance of relative movement between the first pair of panels is equal to or slightly greater than $a$ minus $b$ plus the thickness of one panel, $f$. While it is within the contemplation of the present invention to effect a movement of both panels of the first pair, preferably one of the panels is held stationary while the other is moved rectilinearly. This means that the movable panel, during its movement, must first engage the adjacent marginal edge portions of the second pair of panels and upon continued movement effect a movement of the latter therewith until the opposite marginal edge portions of the second pair of panels interengage the adjacent marginal edge portions of the stationary panel of the first pair. It is contemplated that the second pair of panels will be moved by the movable panel of the first pair before full interengagement, as shown in FIGURE 12, but the total distance of movement set forth above will insure partial interengagement of all of the cooperating marginal edge portions even though the fingers of the movable panel of the first pair should bottom within the notches of the second pair of panels before movement of the latter takes place.

The second step of the present method involves the continuation of the relative rectilinear movement between the first and second pairs of panels toward one another in the direction of extent of the second pair of panels while simultaneously effecting a relative movement between the first and second pairs of panels toward one another rectilinearly in the direction of extent of the first pair of panels a distance sufficient to fully engage or interlock the fingers and notches at the adjacent marginal edge portions of all the panels. This position of full interengagement is shown in FIGURE 13. Here again, while it is within the contemplation of the present invention to effect movement of both of the second pair of panels toward each other, preferably one is held stationary while the other is moved.

It will be understood that the above method of assembly is carried out by the operation of the plunger units 108. The feeding mechanism is operable to present successive sets of four panels to the plunger units in their pre-assembly position. The movement of the feeding mechanism does not substantially change the position of the inner panels with respect to each other as they are carried by the magazine units.

With the above in mind, the operation of the apparatus 10 of the present invention to automatically effect assembly of the successive sets of four panels into box structures will now be described commencing with the feeding mechanism 18 in its upper position and with the plunger units 108 retracted. Manual start-stop valve 240 is initially disposed in its closed position upon actuation of the compressor 174 which will communicate pressure to the main pressure manifold 176. Since the feeding mechanism 18 is disposed in its uppermost position, valve 184 is open communicating air under pressure to the valve 190. Valve 190 is initially opened permitting air under pressure to line 196 providing pilot pressure to the control valve 198, to move the latter into a position to permit cycling of the ram units 156 and 158. However, feeding mechanism ram unit 102 can not by cycled until the start valve 240 is moved into its opened position.

When the valve 198 is actuated by the pressure in line 196, line 202 is pressurized to extend the ram unit 156. The valve choke 194 is set to close the valve 190 so as to vent the pilot line 196 to atmosphere, in closely timed relation after the actuation of valve 198. As the ram unit 156 is extended, valve 208 opens to communicate air under pressure from the line 202 to the ram unit 158 through the line 210. When the ram units 156 and 158 have reached their full extension, trip valve 214 is opened to communicate pilot pressure to the valve 198 to effect movement of the latter into its opposite position. Thus, lines 202, 206 and 210 are exhausted to atmosphere while lines 204 and 212 are pressurized to effect retraction of the ram units 156 and 158. At a pre-determined time, controlled by the setting of choke 236, pilot line 234 to valve 218 is pressurized moving the latter into a position to communicate main pressure line 224 with the line 238.

Continuous operation of the apparatus can now be commenced by manually actuating the start-stop valve 240 to its open position which transmits pilot pressure to the control valve 216. Control valve 216 is thus moved into a position communicating pressure line 222 with line 230 and exhausting line which commence the downward movement of ram unit 102. During the initial downward movement of the feeding mechanism, trip valve 184 is released venting line 188 to atmosphere and thus resetting the valve 190. At a predetermined time, depending upon the setting of choke 252 and the desired downward stroke of the stripper bars 80, pilot line 250 is pressurized to close valve 244 thus venting pilot line 248 to atmosphere and permitting valve 216 to return to its other position. This movement of the valve 216 pressurizes line 238 and exhausts line 230, thus effecting upward movement of the feeding mechanism through the operation of ram unit 102. As the feeding mechanism reaches its uppermost position, trip valve 184 is opened thus pressurizing pilot lines 196 and 232 through the valve 190. Pressurization of pilot line 232 closes valve 218 and exhausts line 238 to atmosphere thus resetting valve 244.

Pressurization of the pilot line 196 effects movement of the control valve 198 into a position pressurizing line 202 and exhausting line 204. As previously described, ram unit 156 is actuated to move the associated plunger unit inwardly until trip valve 208 is opened so as to pressurize line 210 and effect a subsequent simultaneous extension of the ram unit 158. When the ram units 156 and 158 reach their fully extended position, valve 214 is tripped to communicate air under pressure to the pilot line 226 to effect movement of the control valve 198 into its opposite position, as aforesaid. This movement pressurizes line 204 and exhausts line 202 to the atmosphere, thus retracting both of the ram units 156 and 158 and resetting the valves 214 and 208. At a predetermined time following the initial pressurization of the line 204, as determined by the setting of the choke 236, pilot line 234 is pressured to move the valve 218 into a position communicating the line 224 with the pilot pressure line 238. Preferably, the choke 236 is set to pressurize the line 234 at a time just prior to or after the ram units 156 and 158 have returned to their completely retracted position. Pressurization of the pilot line 238 will again provide pilot pressure to operate the control valve 216 to again commence a downward movement of the feeding mechanism thus completing the mechanical movement cycle.

During this cycle the glue mechanisms 16 are operable to inject a quantity of adhesive through the nozzle portions 74 into the notches of the panels aligned therewith in the following manner. It will be noted that valve 266 is normally open to communicate pilot pressure from the line 264 to the glue control valve 260 through line 268. This pilot pressure serves to close the valve 260 so that it is normally closed. Thus, by closing the pilot control valve 266 so as to vent line 268 to atmosphere, the adhesive under pressure in line 258 is allowed to pass through the valve 260 and outwardly to the nozzles through lines 262. Valve 266 is closed in response to the pressurization of line 270 which occurs in response to the movement of the feeding mechanism into its uppermost position. Line 270 will remain pressurized depending upon the setting of choke 194. Preferably, this time period is quite short so as to merely provide a pulse in glue lines 262. Moreover it will be noted that valve 184 is preferably positioned to trip simultaneously with or just before the notches 82 of the stripper bars 80 move over the upper surface of the next adjacent panels in the rows. Consequently, the next adjacent panels move inwardly and assume the position of the inner panels of the rows at the same time or just before the valve 184 is tripped. Since the tripping of the valve 184 signals the adhesive pulse, the adhesive will be injected during the movement of the panels in the rows.

Also, during the mechanical movement cycle, the vacuum pump 272 is connected with the plunger units 108 for controlled communication during pre-determined times in the cycle. This time period is determined by pilot pressure actuation of control valve 280 which during actuation communicates the pump with the plunger units 108. Pilot pressure is transmitted to the control valve 280 when line 230 is pressurized to effect the downward movement of the feeding mechanism so that the vacuum source will be communicated with the plunger units 108 during the downward movement of the feeding mechanism. The setting of choke 286 determines the length of time vacuum communication is continued after line 230 is exhausted at the completion of the downward movement of the stripper bars 80. Preferably, the setting of the choke 286 is such as to exhaust line 284 just prior to or at the completion of the extension of the ram units 156 and 158. In this way the panels in final interlocking engagement will be free to fall by gravity onto a conveyor or the like disposed therebelow as the plunger units begin their movement apart.

It thus will be seen that the objects of this invention have been fully and effectively accomplished. It will be realized, however, that the foregoing specific embodiment has been shown and described only for the purpose of illustrating the principles of the invention and is subject to extensive change without departure from such principles.

What is claimed is:

1. A method of assembling wooden panels each having opposite marginal edge portions formed with a plurality of spaced notches defining a plurality of spaced fingers of a configuration complementary to the notches which comprises the steps of moving four interengageable panels into a separated pre-assembly position wherein a first pair of panels is disposed in coextensive parallel relation and the other pair of panels is disposed in coextensive parallel relation with each other and in coextensive normal relation to said first pair of panels and wherein the opposed flat surfaces of said first pair of panels are spaced apart a distance greater than the exterior dimension of the assembled panels measured in the direction of extent of said second pair panels and the opposed flat surfaces of said second pair of panels are spaced apart a distance less than the exterior dimension but greater than the interior dimension of the assembled panels measured in the direction of extent of said first pair of panels, effecting a relative movement between said first and second pairs of panels toward one another rectilinearly in the direction of extent of said second pair of panels a distance sufficient to partially interengage the fingers and notches at the adjacent marginal edge portions of all of said panels and then continuing said relative movement while simultaneously effecting a relative movement between said first and second pairs of panels toward one another rectilinearly in the direction of extent of said first pair of panels a distance sufficient to fully interengage the fingers and notches at the adjacent marginal edge portions of all of said panels.

2. A method of gluing and assembling wooden panels each having opposite marginal edge portions formed with a plurality of spaced notches defining a plurality of spaced fingers of a configuration complementary to the notches which comprises the steps of providing a supply of interengageable panels in four rows in which each row includes an inner panel, an outer panel and a plurality of panels therebetween having each flat surface thereof disposed in coextensive abutting relation to a flat surface of an adjacent panel, maintaining the inner panels of the rows in a feeding position wherein a first pair of inner panels is disposed in coextensive parallel relation and the other pair of inner panels is disposed in coextensive parallel relation with each other in coextensive normal relation to said first pair of panels and wherein the opposed flat surfaces of said first pair of inner panels are spaced apart a distance greater than the exterior dimension of the inner panels a distance greater than the exterior dimension of the assembled inner panels measured in the direction of extent of said second pair of inner panels and the opposed flat surfaces of said second pair of inner panels are spaced apart a distance less than the exterior dimension but greater than the interior dimension of the assembled inner panels measured in the direction of extent of said first pair of inner panels, applying an adhesive within the notches of at least one of each pair of interengaging marginal edge portions of said inner panels, moving the inner panels of said rows out of abutting engagement with the next adjacent panels of said rows and into a pre-assembly position wherein said inner panels are disposed in substantially the same relative position with respect to each other as in said feeding position, effecting a relative movement between said first and second pairs of inner panels in said pre-assembly position toward one another rectilinearly in the direction of extent of said second pair of inner panels a distance sufficient to partially interengage the fingers and notches at the adjacent marginal edge portions of all of said inner panels, continuing said relative movement while simultaneously effecting a relative movement between said first and second pairs of inner panels toward one another rectilinearly in the direction of extent of said first pair of inner panels a distance sufficient to fully interengage the fingers and notches at the adjacent marginal edge portions of all of said inner panels.

3. Apparatus for assembling wooden panels each having opposite marginal edge portions formed with a plurality of spaced notches defining a plurality of spaced fingers of a configuration complementary to the notches comprising frame means, opposed pairs of panel engaging means carried by said frame means for receiving and supporting successive sets of four interengageable panels in a separated pre-assembly position wherein a first pair of panels is disposed in coextensive parallel relation and the other pair of panels is disposed in coextensive parallel relation with each other and in coextensive normal relation to said first pair and wherein the opposed flat surfaces of said first pair of panels are spaced apart a distance greater than the exterior dimension of the assembled panels measured in the direction of extent of said second pair of panels and the opposed flat surfaces of said second pair of panels are spaced apart a distance less than the exterior dimension but greater than the interior dimension of the assembled panels measured in the direction of extent of said first pair of panels, first power operated means for effecting a relative movement between a first pair of opposed panel engaging means toward and away from each other between said pre-assembly position and a panel interlocking position so that during an initial predetermined portion of the relative movement of said first pair of opposed panel engaging means toward each other the set of four panels will be moved relatively into an initially interengaged position wherein the fingers and notches at adjacent marginal edge portions of all of said panels are partially interengaged, and second power operated means operable in response to the movement of said panels into said initially interengaged position by the initial movement of said first power operated means for effecting a relative movement between the other pair of opposed panel engaging means toward each other from the pre-assembly position into a panel interlocking position and away from each other from said interlocking position into said pre-assembly position.

4. Apparatus as defined in claim 3 including means carried by said frame means for receiving and supporting four rows of panels in opposed pairs normal to each other in which each row includes an inner panel, an outer panel and plurality of panels therebetween having each flat surface thereof disposed in coextensive abutting relation to a flat surface of an adjacent panel so that the inner panels are disposed in substantially the same position relative to each other as said preassembly position and are movable rectilinearly downwardly out of their associated rows and each outer panel is biased for movement toward the associated inner panel and third power operated means for effecting a downward rectilinear movement of the successive inner panels in said row supporting means out of their respective rows and into said pre-assembly position to be received and retained by said opposed pairs of panel engaging means.

5. Apparatus as defined in claim 4 including means carried by said frame means for applying an adhesive to the panels of said rows so that the notches of at least one of each pair of interengaging marginal edge portions of said inner panels have adhesive applied thereto prior to their downward movement out of their respective rows.

6. Apparatus as defined in claim 4 including means for automatically actuating said first, second and third power operated means to effect a continuous sequence of movements thereby.

7. Apparatus for assembling wooden panels each having opposite marginal edge portions formed with a plurality of spaced notches defining a plurality of spaced fingers of a configuration complementary to the notches comprising frame means, four magazine units mounted on said frame means in opposed pairs normal to each other for supporting four rows of panels each in which includes an inner panel, an outer panel and a plurality of panels therebetween having each flat surface thereof disposed in coextensive abutting relation to a flat surface of an adjacent panel, each of said magazine units including means for supporting the inner panel of the row for downward rectilinear movement out the row and means for biasing the outer panel of the row for movement toward the inner panel of the row, means carried by said frame means for applying an adhesive to the panels of said rows so that the notches of at least one of each pair of interengaging marginal edge portions of said inner panels have adhesive applied thereto prior to their downward movement out of their respective rows, four panel stripper bars each having means thereon for engaging an inner panel of an associated row, means mounting said stripper bars on said frame means in opposed pairs normal to each other for vertical reciprocating movement together during the downward movement of which said stripper bars serve to move the inner panels from their respective rows into a preassembly position, first power operated means for effecting said vertical reciprocating movement of said stripper bars, four inner panel engaging units each having panel engaging surface means and means for communicating a vacuum source to said panel engaging surface means to retain a panel engaged thereon, means for mounting one pair of said inner panel engaging units in opposed relation on said frame means for relative rectilinear movement toward and away from each other, second power operated means for effecting said relative movement between said one pair of inner panel engaging units, means for mounting the other pair of said inner panel engaging units on said frame means in opposed relation normal to said one pair for relative rectilinear movement toward and away from each other, third power operated means for effecting said relative movement between said other pair of inner panel engaging units, means for actuating said first power operated means to effect an upward movement of said stripper bars in response to the completion of the downward movement of said stripper bars, means operable in response to the completion of the upward movement of said stripper bars for actuating said second power operated means to effect movement of said one pair of inner panel engaging units toward each other, means operable in response to a predetermined travel of relative movement between said one pair of inner panel engaging units toward each other for actuating said third power operated means to effect a relative movement of said other pair of inner panel engaging units toward each other, means operable in response to the completion of the relative movement of said pairs of inner panel engaging units toward each other for actuating said second and third power operated means to effect a relative movement of said pairs of inner panel engaging units away from each other, and means operable in response to the completion of the relative movement of said pairs of inner panel engaging units toward each other for actuating said first power operated means to effect a downward movement of said stripper bars.

8. Apparatus as defined in claim 7 wherein said stripper bar mounting means includes means for adjustably fixedly securing said stripper bars together with varying space between each pair of opposed stripper bars.

9. Apparatus as defined in claim 8 wherein said adjustable stripper bar securing means comprises a mounting plate having four radially extending grooves formed in the lower surface thereof, each of said stripper bars having an upper end portion disposed in one of said grooves, said mounting plate also having an elongated slot extending therethrough in communication with each groove and a fastening element extending through each slot in fixed securement between said mounting plate and the associated stripper bar.

10. Apparatus as defined in claim 7 wherein said inner panel engaging units mounting means includes a mounting block for each inner panel engaging unit, each panel engaging unit including a pair of panel engaging members and means for fixedly securing each pair of panel engaging members to the associated mounting block in a multiplicity of varying horizontally spaced positions.

11. Apparatus as defined in claim 10 wherein said inner panel engaging units mounting means further includes means for fixedly securing one of the mounting blocks associated with each opposed pair of panel engaging units in a multiplicity of adjusted positions on said frame means toward and away from the other mounting block of the associated pair and means for mounting the other mounting block of each pair for horizontal reciprocating movement between a multiplicity of adjusted inner and outer limits.

12. Apparatus as defined in claim 7 wherein said glue applying means includes four hollow bodies for receiving a supply of adhesive therein, each of said bodies including a plurality of spaced nozzle portions of a shape to engage within the notches of the row of panels associated therewith.

13. Apparatus as defined in claim 7 including means for injecting a charge of adhesive through said nozzle portions in response to the completion of the upward movement of said stripper bars.

14. The apparatus as defined in claim 7 including means for controlling the communication of a vacuum source to said panel engaging surface means operable in response to the commencement of the downward movement of said stripper bars to permit communication of the vacuum source and operable in response to the completion of the relative movement of said panel engaging units toward each other to discontinue communication of the vacuum source.

References Cited

UNITED STATES PATENTS 613,626  11/1898  Gilliland __________ 156—304

EARL M. BERGERT, *Primary Examiner.*

M. E. McCAMISH, *Assistant Examiner.*